United States Patent

Schroader et al.

[11] Patent Number: 6,131,723
[45] Date of Patent: Oct. 17, 2000

[54] METHODS AND APPARATUS FOR CONVEYING PACKAGES IN MANNER MINIMIZING JAMS

[75] Inventors: Steven Vann Schroader; Edward Ydoate, both of Louisville, Ky.

[73] Assignee: Sandvik Sorting Systems, Inc., Louisville, Ky.

[21] Appl. No.: 09/234,296

[22] Filed: Jan. 21, 1999

[51] Int. Cl.[7] .......................... B65G 47/24; B65G 47/34; B65G 37/00; B65G 47/82
[52] U.S. Cl. .......................... 198/597; 198/398; 198/452
[58] Field of Search .................................... 198/396, 452, 198/447, 451, 454, 455, 457, 597, 601, 398; 209/651, 654, 918, 919

[56] References Cited

U.S. PATENT DOCUMENTS

| | | | |
|---|---|---|---|
| 4,431,104 | 2/1984 | Orlowski et al. | 198/447 |
| 4,546,870 | 10/1985 | Cogo | 198/447 |
| 4,889,224 | 12/1989 | Denker | 198/382 |
| 5,222,586 | 6/1993 | Ydoate et al. | |
| 5,372,238 | 12/1994 | Bonnet | 198/443 |
| 5,701,989 | 12/1997 | Boone et al. | 198/448 X |
| 5,738,202 | 4/1998 | Ydaote et al. | 198/460.1 X |
| 5,950,800 | 9/1999 | Terrell et al. | 198/448 X |

*Primary Examiner*—Christopher P. Ellis
*Assistant Examiner*—Gene O. Crawford
*Attorney, Agent, or Firm*—Burns, Doane, Swecker & Mathis, LLP

[57] ABSTRACT

Packages are conveyed in a direction of travel by transferring the packages from an upstream conveying surface to an intermediate conveying surface, conveying the packages along the intermediate conveying surface, and transferring the packages from the intermediate conveyor surface to a downstream conveying surface. A discharge member situated along at least one laterally outer edge of the intermediate conveying surface is driven such that a discharge surface thereof situated above the intermediate conveying surface moves in a direction away from a center line of the intermediate conveyor and pulls wide packages from the intermediate conveying surface, i.e., packages having a width great enough to contact the discharge surface.

19 Claims, 5 Drawing Sheets

METHODS AND APPARATUS FOR CONVEYING PACKAGES IN MANNER MINIMIZING JAMS

BACKGROUND OF THE INVENTION

The present invention relates to material handling and, in particular, to methods and apparatuses for conveying packages and a mechanism for controlling the location of packages on a conveyor.

It is conventional to convey large numbers of packages at high speed, especially in the parcel delivery industry, wherein the packages are sorted according to desired categories. The efficiency with which the packages are handled can be seriously diminished when jam-ups of packages occur that require that conveyor lines be shut down until the jam has been cleared.

While a jam-free conveyance of packages along the straight flights of a conveyor is relatively easily accomplished, problems can occur at turns where wide packages present a serious risk of jamming. The sharper the turn the greater the risk.

Measures to minimize this risk have been taken, such as that disclosed in Ydoate et al. U.S. Pat. No. 5,222,586, the disclosure of which is incorporated herein by reference. As depicted in FIGS. 1–4, a conveyor junction 10 for packages comprises an upstream conveyor 12, a downstream conveyor 14, and an intermediate conveyor 16, each having a conveying surface. The conveyors 12, 14, 16 preferably comprise suitably driven conveyor mechanisms, such as a solid or mesh belt or a series of driven rollers. The upstream conveyor 12 extends around a drive drum 22, and the downstream conveyor 14 extends around a drive drum 24.

Extending along one side of the conveyors 12, 14, 16 is an upright side wall 26. The upstream conveyor 12 receives packages P from a conveyor (not shown) which is intended to align the packages in the direction of travel and position the packages in single file along the side wall 26. The side wall thus guides the packages and defines a reference line along which inner edges of the packages travel.

Occasionally, however, it occurs that instead of being positioned in single file, some of the packages may be conveyed abreast of one another, i.e., in side-by-side relationship. For example, the packages P1, P2 are traveling abreast. The combined width CW occupied by those two packages may present a problem at a downstream location in the conveyor system, especially around turns by creating a jam.

Also, a single package P3 depicted in FIG. 3 may be of such a large width W' that it might jam in the downstream turns.

The risk that the abreast packages P1, P2, or the excessively wide package P3 may jam downstream is prevented by the conveyor junction 10, wherein the width W1 of the upstream conveyor is larger than each of the widths W2 and W3 of the downstream and intermediate conveyors 14, 16, and wherein the width W3 of the intermediate conveyor is less than one-half of the width W2 of the downstream conveyor 14. Those widths are measured from the reference line defined by the guide wall 26 to an outer edge of the respective conveyors 12, 14, 16.

As a result, in the case of packages P1, P2 traveling abreast, the outer package P2 (i.e., the package farthest from the side wall 26) will have its center of gravity situated outside of the outer edge 28 of the intermediate conveyor 16 and will fall off that conveyor into a drop-off zone 30 as depicted in FIG. 2. A ramp 32 is situated in the drop-off zone to guide the package P2 when it falls off the intermediate conveyor 16. The discharged package P2 can then be manually replaced onto the conveyor system. Alternatively, the packages can fall onto another conveyor which transports the packages to a suitable location.

The length L of the intermediate conveyor should be made larger than the length of the longest package anticipated to be conveyed.

The exceptionally wide package P3, depicted in FIG. 3, has a width W' greater than the width W2 of the downstream conveyor, whereby its center of gravity CG is situated outside of the edge 28 of the intermediate conveyor (assuming a substantially uniform distribution of the weight of the package contents as is generally the case). That package will, therefore, fall down the chute, as depicted in FIG. 3.

This tends to ensure that the packages reaching the downstream conveyor 14 will be in single file and will present a width which is less than the width W2 of the downstream conveyor. Consequently, the risk of jams occurring downstream of the intermediate conveyor, especially during turns, will be minimized.

In order to expedite the egress of packages from the intermediate conveyor 16, a discharge accelerator may be provided, as depicted in FIG. 4. The discharge accelerator comprises a roller 40 which is driven in a direction tending to frictionally displace a falling package downwardly. The roller 40 is rotated about an axis extending parallel to the reference line defined by the wall 26 by means of a motor 42. In order to ensure that the packages do not engage the roller 40 unless they are actually falling from the intermediate conveyor, the roller 40 is disposed at a lower elevation than the convening surface of the intermediate conveyor.

Although the afore-described apparatus has performed with beneficial results, room for improvement remains. That is, in order for a package to be discharged into the drop-off zone 30, its center of gravity must be situated outside of the outer edge 28, so that the package tilts downwardly. In dealing with that requirement, the above-described apparatus assumes that the center of gravity of each package is disposed at its geometric center. In reality, however, that is not always the case, and it would be desirable to provide a system which deals with situations in which the center of gravity is offset from the geometrical center.

Also, since the afore-mentioned apparatus requires that a package tilt and fall downwardly in order to be rejected, a certain minimum vertical height of the apparatus is required which might not be desirable in some situations involving restricted height conditions. Therefore, an apparatus which requires less height would be advantageous in some applications.

SUMMARY OF THE INVENTION

One aspect of the present invention relates to a conveying apparatus for conveying packages in a direction of travel. The apparatus comprises an upstream conveying surface for conveying packages, a downstream conveying surface, and an intermediate conveying surface situated between the upstream and downstream conveying surfaces for transferring packages from the upstream conveying surface to the downstream conveying surface. The intermediate conveying surface has a minimum width which is less than a width of each of the upstream and downstream conveyors. A driven discharge member is disposed adjacent a laterally outer edge of the intermediate conveying surface and includes a discharge surface projecting above the intermediate conveying surface and driven in a direction away from a center line of the intermediate conveying surface for removing wide packages from the intermediate conveying surface in a laterally outward direction.

Another aspect of the invention pertains to a method of conveying packages in a direction of travel comprising the steps of:

A) transferring the packages from an upstream conveying surface to an intermediate conveying surface;

B) conveying the packages along the intermediate conveying surface;

C) transferring the packages from the intermediate conveying surface to a downstream conveying surface; and D) driving a discharge member situated along a laterally outer edge of the intermediate conveying surface such that a discharge surface of the discharge member situated above the intermediate conveying surface moves in a direction away from the side guide surface and tends to pull from the intermediate conveying surface packages having a width great enough to contact the discharge surface.

BRIEF DESCRIPTION OF THE DRAWING

The objects and advantages of the invention will become apparent from the following detailed description of preferred embodiments thereof in connection with the accompanying drawing in which like numerals designate like elements and in which:

FIG. 6 is a side elevational view of the conveyor junction depicted in

FIG. 5, with a downstream conveying surface added thereto;

DETAILED DESCRIPTION OF PREFERRED EMBODIMENTS OF THE INVENTION

Figure 5:
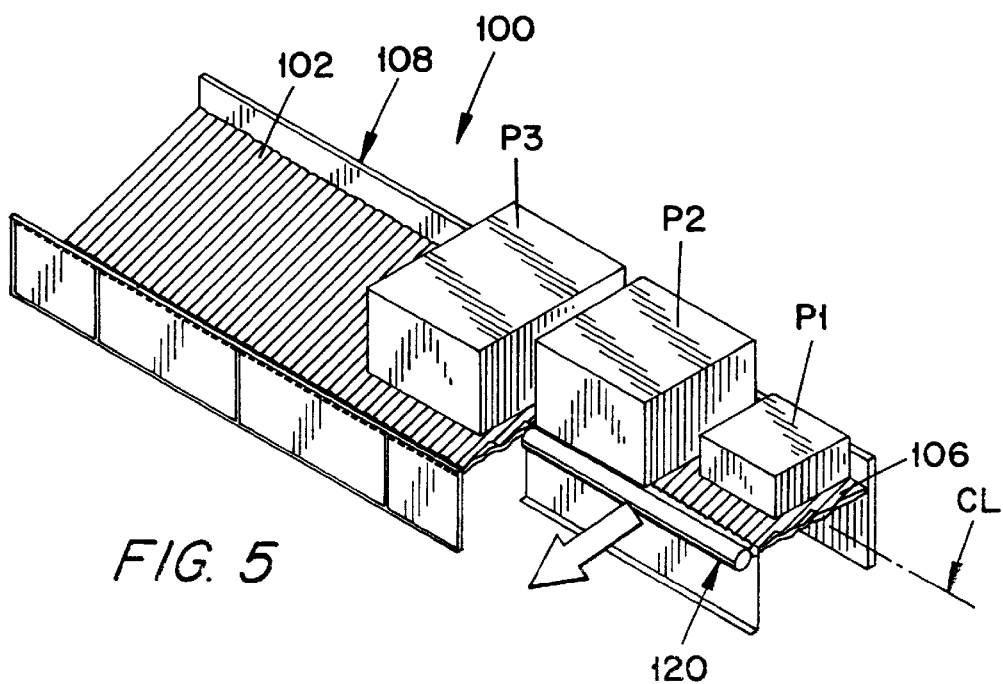
FIG. 5 is a top perspective view of a portion of a conveyor junction according to the present invention as packages are being conveyed therealong.
Figure 6:
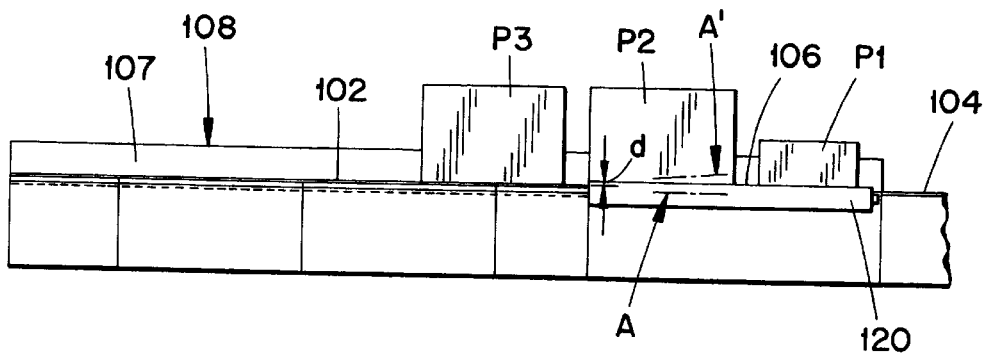

Depicted in FIGS. 5 and 6 is a conveyor junction 100 comprising an upstream conveyor 102, a downstream conveyor 104 (shown in FIGS. 6 and 7 but omitted in FIG. 5 for clarity), and an intermediate conveyor 106. Each of the conveyors has a conveying surface formed by driven rollers rotating about parallel axes oriented non-perpendicularly to a direction of package travel so as to urge the packages against a guide surface 107 formed by a side wall 108.

Alternatively, the conveying surfaces could comprise belts, or possibly chutes.

The upstream conveyor 102 receives packages P from a conveyor, such as an unscrambling conveyor, an accumulating conveyor, or an aligner conveyor, for example, which is intended to align the packages in the direction of travel and position the packages in single file along side guide surface 107 which thus defines a travel reference line R. The side wall 108 could be stationary or defined by a vertical belt or rollers.

The width WI of the upstream conveyor 102 (measured perpendicular to the reference line R) is larger than the width W3 of the intermediate conveyor 106, and also larger than the width W2 of the downstream conveyor 104. In the embodiment depicted in FIGS. 5–8, the width of the intermediate conveying surface is constant. As will become evident from a description of other embodiments of the invention, that need not be the case, i.e., the intermediate conveying surface can have a varying width. However, the minimum width of the intermediate conveying surface should be less than respective widths of the upstream and downstream conveying surfaces.

Figure 1:
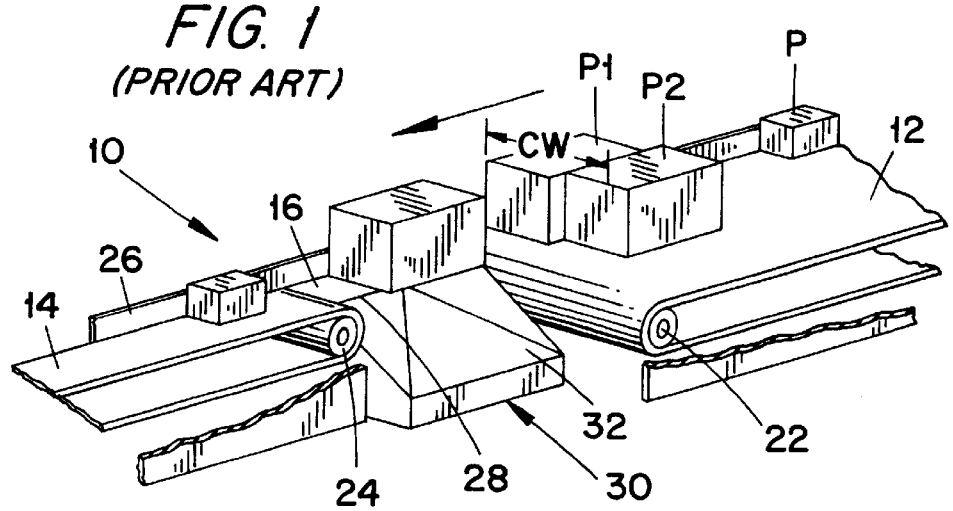
FIG. 1 is a perspective view of a prior art conveyor junction as packages are being conveyed therealong.
Figure 2:
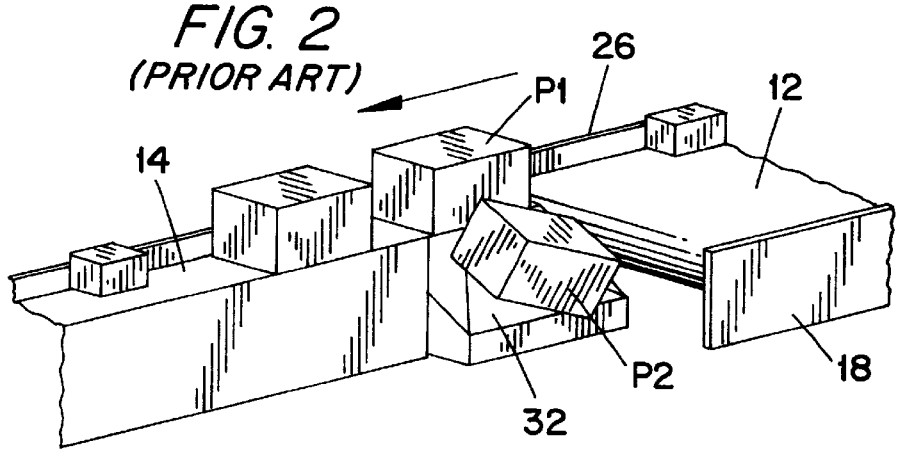
FIG. 2 is a view similar to FIG. 1 as a package falls from a drop off zone of the conveying apparatus.
Figure 3:
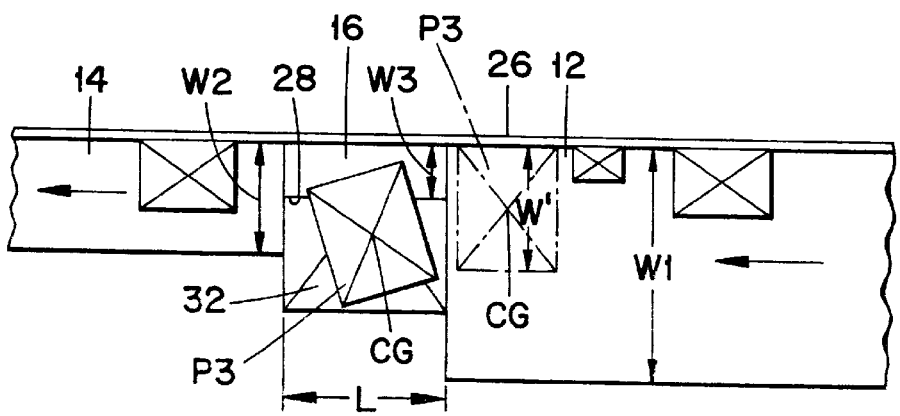
FIG. 3 is a plan view of the conveying apparatus depicted in FIG. 1 as an exceptionally wide package falls from the drop off zone.
Figure 4:
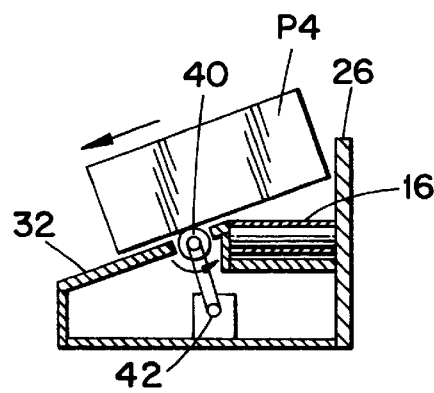
FIG. 4 is a view similar to FIG. 2 of a modified embodiment of the prior art conveyor junction.

In accordance with the present invention, wide packages will tend to be pulled off the intermediate conveyor in a laterally outward direction, i.e., a direction away from a center line CL of the intermediate conveying surface. That is achieved by the provision of a rotationally driven discharge member disposed along a laterally outer edge of the intermediate conveyor 106 and projecting thereabove by a slight distance d (see FIG. 6). The discharge member may be in the form of a roller 120 oriented with its axis of rotation A extending generally in the direction of package travel, e.g., parallel or substantially parallel to the reference line R. The roller 120 is driven by any suitable drive mechanism, such as the motor shown in FIG. 4, in a direction whereby its topmost portion moves away from the center line CL.

That topmost portion of the roller 120 projects slightly above the conveying surface defined by the rollers of the intermediate conveyor 106 and defines a discharge surface. Thus, it will be appreciated that packages having a width sufficiently great to enable the laterally outer portion thereof to engage the roller 120 (i.e., a "wide package") will be urged laterally outwardly by that roller and will be removed from the conveying surface of the intermediate conveyor, even if the center of gravity of the package is offset from the outer edge of the intermediate conveyor in a direction away from the discharge roller. In the unlikely event that the center of gravity of the package is located very far from the outer edge, then it is possible that the package may not be pulled off the intermediate conveyor.

Figure 7:
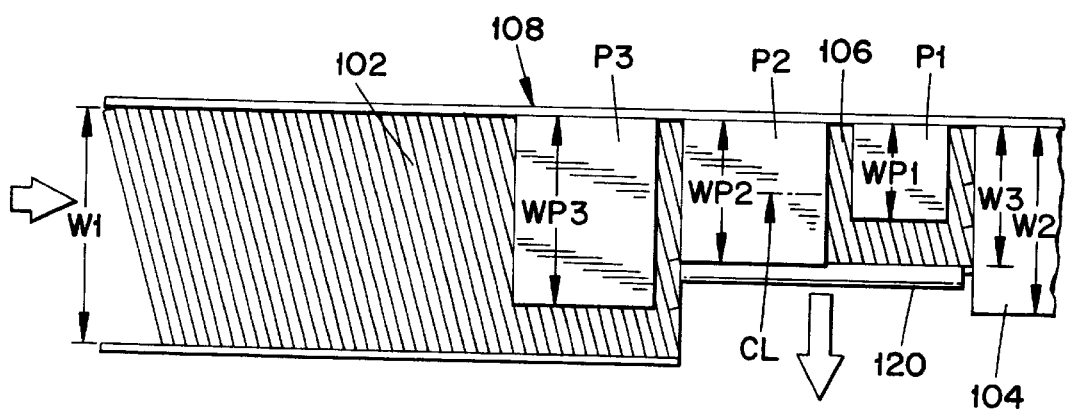
FIG. 7 is a top plan view of the conveyor junction depicted in FIG. 6.
Figure 8:
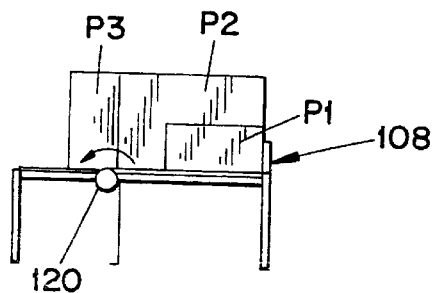
FIG. 8 is an end view of the conveyor junction depicted in FIG. 7, with a downstream conveying surface removed.

In FIG. 7, a package P1 has a width WP1 shorter than the width W3, so it will not be discharged laterally off the intermediate conveyor. A package P2 has a width WP2 long enough for a laterally outer edge thereof to contact the roller 120, so it constitutes a wide package that will be laterally discharged. A package P3 has a width WP3 great enough to enable the package bottom to contact the roller 120; the package P3 is thus also a wide package that will be discharged laterally by the roller.

Accordingly, packages having a width large enough to pose a jamming problem in the downstream conveyor(s), will be removed from the conveyor line for separate handling. The removed packages could be transferred to a conveyor (now shown), or additional driven rollers (not shown) arranged parallel to the roller 120, whereby the roller 120 constitutes part of a conveyor. Alternatively, the removed packages could be allowed to fall or slide downwardly into a drop-off zone.

Since the roller 120 projects slightly above the conveying surface of the intermediate conveyor, it is guaranteed that the roller 120 will contact the wide packages.

Preferably, the outer surface of the roller 120 is provided with a high-friction surface, at least higher than that of the intermediate conveying surface.

In the depicted embodiment, the axis A of the roller 120 is exactly parallel to the direction of package travel, so the topmost portion of the entire length of the roller projects slightly above the conveying surface of the intermediate conveying roller. That means that the roller 120 may also project slightly above the conveying surface of the upstream conveyor 102, whereby the wide packages must rise over an end of the roller 120 as they are being transferred onto the intermediate conveyor 106. In order to avoid that requirement, it may be desirable to slightly incline the axis of the roller 120 by an angle (the inclined axis shown somewhat exaggeratedly at A' in FIG. 6) whereby the end of the roller disposed adjacent the upstream conveyor 102 is slightly lower than the opposite end and lies flush (or slightly below) the conveying surface of the upstream conveyor. In that event, the topmost portion of the roller 120 of only a part of the length thereof will project above the conveying surfaces of the conveyors 102 and 106, even though the axis A is still generally parallel to the direction of package travel. That is sufficient to achieve the lateral discharge of wide packages. Alternatively, the same result could be achieved through the use of a conical roller 120A whose axis is parallel to the line R and whose small diameter end is located adjacent the upstream conveyor 102 (see FIG. 13).

Figure 9:
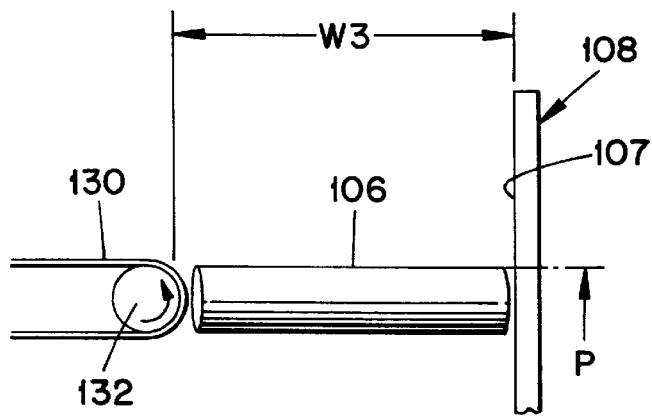
FIG. 9 is a schematic end view of a second embodiment of an intermediate conveyor according to the present invention.

In lieu of a roller 120, the discharge member could comprise other devices such as an endless belt 130, as shown in FIG. 9. The belt 130 rotates around a support roll 132 and defines a discharge surface situated higher than the intermediate conveying surface 106. If desired, the axis of the support roll could be inclined in the same manner as described in connection with the axis A' of the roller 120 shown in FIG. 6 so that the conveyor belt 130 provides for a smooth transfer of wide packages onto the intermediate conveyor, i.e., the belt 130 would project above the intermediate conveying surface for only a part of the width of the belt 130.

It should be noted that in connection with the present invention, the width W3 of the intermediate conveying surface is defined by a line disposed in the plane P of the intermediate conveying surface and extending perpendicularly relative to the center line to a point of intersection with the discharge number 120 or 130 (e.g., see the width W3 shown in FIG. 9).

Figure 10:
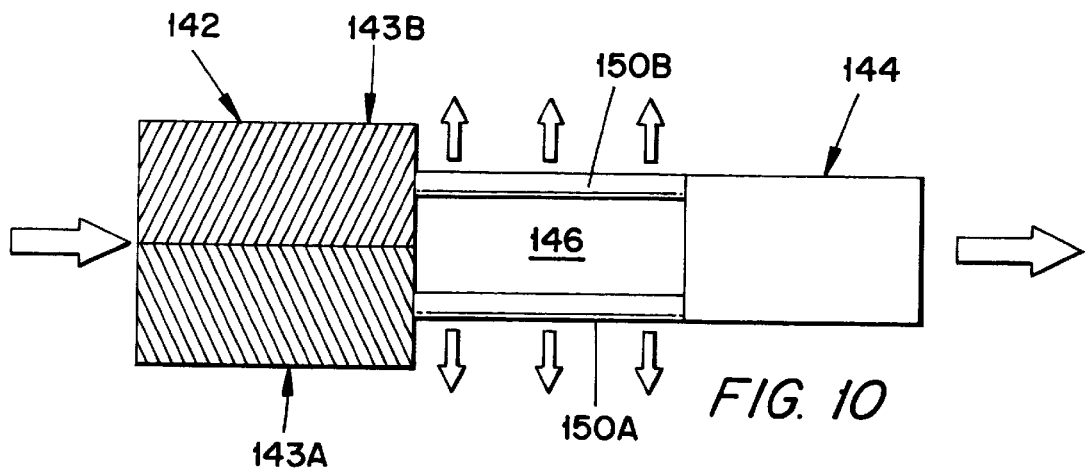
FIGS. 10–15 are schematic top plan views of respective embodiments of the invention.

Depicted in FIG. 10 is an alternate embodiment wherein the packages are not guided along a guide wall when traveling on the intermediate conveyor 146. Rather, the intermediate conveyor comprises a low-friction belt as shown, or alternatively driven low-friction rollers whose axes are oriented perpendicular to the center line. The intermediate conveyor receives packages from the upstream conveyor 142 which comprises side-by-side conveyor sections 143A, 143B, each including a plurality of parallel rollers whose axes are skewed (i.e., oriented at an oblique angle) relative to the center line. The rollers of the two sections 143A, 143B are skewed in opposite directions, to cause the packages to have their centers of gravity disposed along a line disposed midway between adjacent edges of the conveyor sections. Situated along each lateral edge of the intermediate conveyor 146 is a discharge member 150A or 150B, e.g. in the form of a driven roller (or belt). Therefore, an outer edge of a wide package will make contact with one of the discharge rollers 150A, 150B and will be laterally discharged before reaching the downstream conveyor 146.

Figure 11:
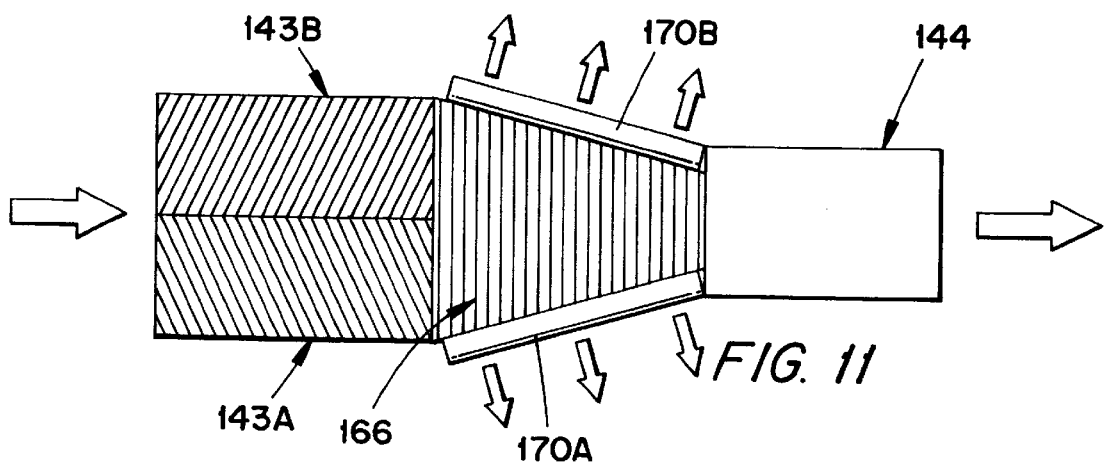

In FIG. 11 there is disclosed a modified form of the arrangement depicted in FIG. 10 wherein the intermediate conveyor 166 comprises low-friction rollers whose axes are oriented perpendicular to the center line and are of gradually diminishing width in a downstream direction. The center of each roller lies on the center line, whereby the lateral edges of the intermediate conveyor 166 converge in a downstream direction. The high-friction discharge rollers 170A, 170B are oriented to rotate about axes which are parallel to respective ones of those lateral edges and thus are convergent in the downstream direction. The width of the intermediate conveyor varies, but the minimum width thereof is less than the widths of each of the upstream and downstream conveyors.

Figure 12:
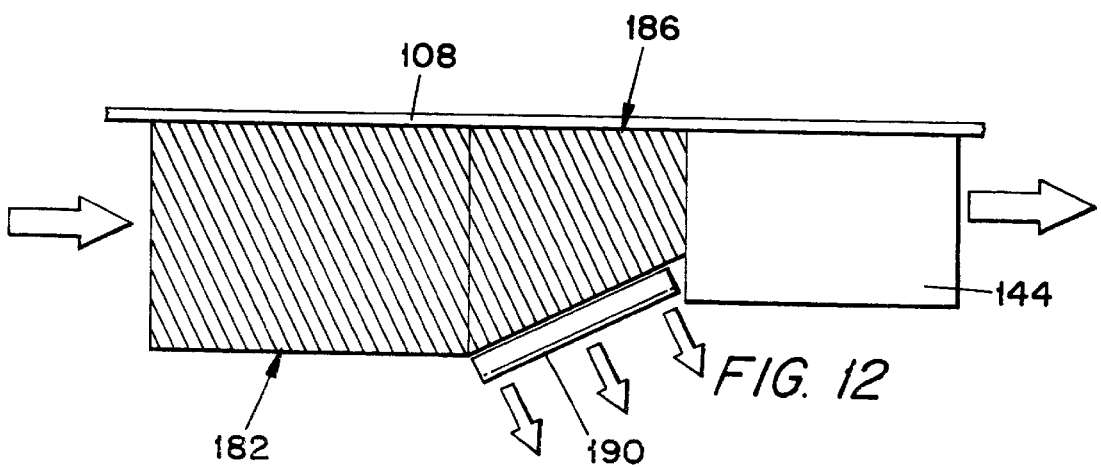

In FIG. 12 another embodiment of the invention is disclosed wherein a guide wall 108 is provided, and wherein each of the upstream and intermediate conveyors 182, 186 comprises skewed rollers. The lengths of those rollers is such that one lateral edge of the intermediate conveyor converges toward the center line in a downstream direction. A discharge roller 190 rotates about an axis oriented parallel to that lateral edge. Packages will be guided along the wall 108, and wide packages will be pulled laterally from the intermediate conveyor 186 by the discharge roller 190 before reaching the downstream conveyor. As in the case of FIG. 11, the minimum width of the downstream conveyor is less than widths of each of the upstream and downstream conveyors.

Figure 13:
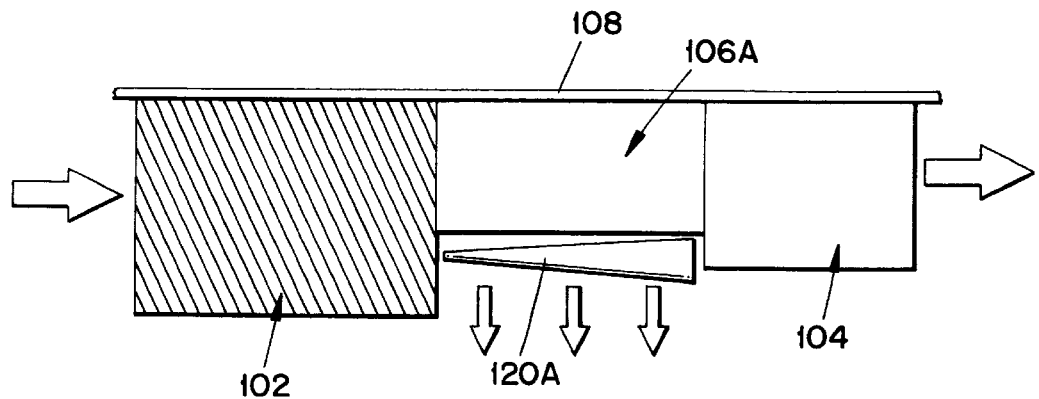

The arrangement shown in FIG. 13 has been earlier described, i.e., a conical roller 120A is employed as the discharge member. The intermediate conveyor 106A is shown as a belt, but it could comprise skewed rollers.

Figure 14:
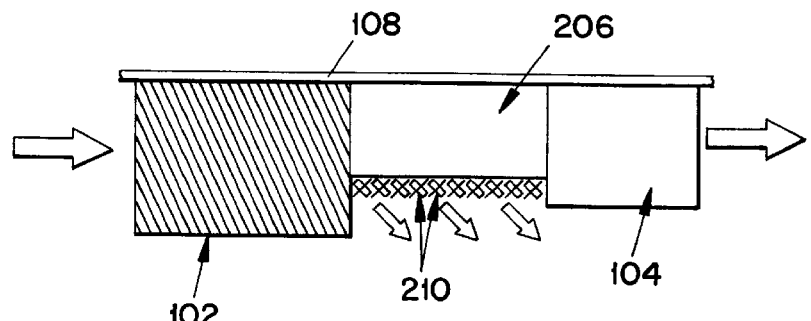

In FIG. 14 the discharge member comprises a plurality of short discharge rollers 210 having their axes of rotation oriented parallel to one another and at an oblique angle with respect to the lateral edge of the intermediate conveyor 206, which lateral edge extends parallel to the center line.

Figure 15:
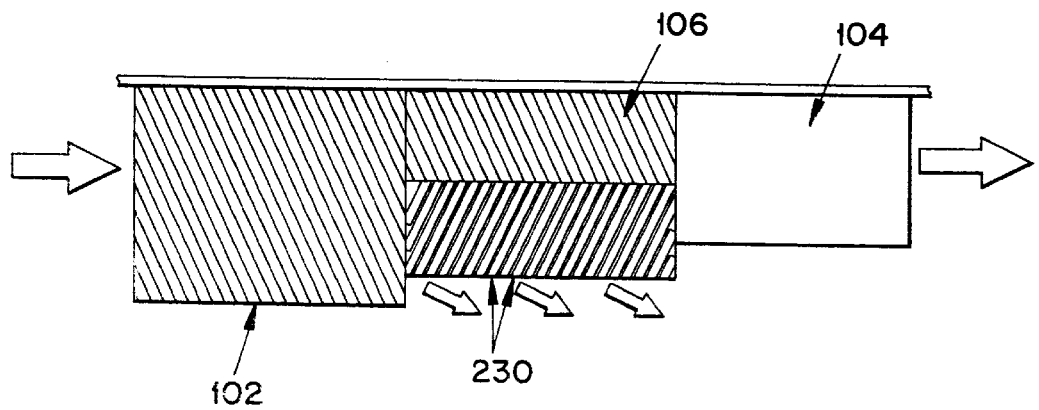

In FIG. 15, discharge rollers 230 are provided as in FIG. 14, but they are longer than the discharge rollers 210 of FIG. 14.

As noted earlier, the surface(s) of the discharge member is of higher friction than that of the intermediate conveying surface to facilitate removal of the wide packages.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A conveying apparatus for conveying packages in a direction of travel, comprising:

an upstream conveying surface for conveying packages;

a downstream conveying surface;

an intermediate conveying surface situated between said upstream and downstream conveying surfaces for transferring packages from said upstream conveying surface to said downstream conveying surface, said intermediate conveying surface having a minimum width less than a width of each of said upstream and downstream conveying surfaces; and a driven discharge member disposed adjacent a first lateral edge of said intermediate conveying surface and including a discharge surface of higher coefficient of friction than said intermediate conveying surface and projecting above said intermediate conveying surface, said discharge surface driven in a direction away from a center line of said intermediate conveying surface for removing wide packages from said intermediate conveying surface in a laterally outward direction.

2. The conveying apparatus according to claim 1 wherein there are two said discharge members disposed along both lateral edges of said intermediate conveyor.

3. The conveying apparatus according to claim 1 wherein said discharge member rotates about an axis converging toward said center line in a downward direction.

4. The conveying apparatus according to claim 1 wherein said discharge member comprises a plurality of rollers rotatable about parallel axes, each axis converging toward said center line in a downstream direction.

5. The apparatus according to claim 1 wherein said discharge member comprises a belt mounted on a support roll, said support roll being rotatable about an axis extending generally parallel to said direction of travel.

6. The apparatus according to claim 1 wherein one end of said discharge member situated adjacent said upstream conveying surface is situated no higher than said upstream conveying surface, and an opposite end of said discharge member is disposed above said intermediate conveying surface.

7. The conveying apparatus according to claim 6 wherein said discharge member comprises a conical roller having an axis of rotation oriented parallel to said center line, a smaller diameter end of said roller situated adjacent said upstream conveyor.

8. The conveying apparatus according to claim 1 further including a side guide surface situated adjacent a second lateral edge of said intermediate conveying surface for guiding packages.

9. The conveying apparatus according to claim 8 wherein said intermediate conveyor is arranged to bias packages toward said side guide surface.

10. The conveying apparatus according to claim 9 wherein said intermediate conveyor comprises parallel rollers skewed relative to said side guide surface to bias packages toward said side guide surface.

11. The apparatus according to claim 1 wherein said discharge member comprises a roller rotatable about an axis extending parallel to said center line.

12. The conveying apparatus according to claim 1 wherein said intermediate conveying surface comprises a series of rollers rotatable about parallel axes, ends of said rollers situated adjacent said discharge member lying on a line extending at an oblique angle relative to said center line, said discharge member arranged at said oblique angle relative to said center line.

13. The conveying apparatus according to claim 8 wherein said axes of said rollers are oriented perpendicular to said center line.

14. The conveying apparatus according to claim 12 wherein said axes of said rollers are oriented at an oblique angle relative to said center line.

15. The conveying apparatus according to claim 1 wherein said upstream conveyor comprises two side-by-side conveying sections each comprised of rollers rotatable about parallel axes, axes of one of said conveyor sections diverging from the axes of the other conveying sections, wherein said conveying sections orient centers of gravity of packages along a line disposed midway between adjacent edges of said conveying sections.

16. The conveying apparatus according to claim 15 wherein said intermediate conveyor has a center line aligned with said line disposed midway between said conveyor sections, there being discharge members located along each lateral edge of said intermediate conveyor.

17. The conveying apparatus according to claim 16 wherein said discharge members are rotatable about parallel axes.

18. conveying apparatus according to claim 16 wherein said discharge members are rotatable about axes that converge in a downstream direction.

19. A method of conveying packages in a direction of travel comprising the steps of:
A) transferring the packages from an upstream conveying surface to an intermediate conveying surface;
B) conveying the packages along said intermediate conveying surface;
C) transferring the packages from said intermediate conveying surface to a downstream conveying surface; and
D) driving a discharge member situated along a laterally outer edge of said intermediate conveying surface such that a discharge surface of said discharge member situated above said intermediate conveying surface and having a higher coefficient of friction than said intermediate conveying surface moves in a direction away from said side guide surface and tends to pull from said intermediate conveying surface wide packages having a width great enough to contact said discharge surface.

* * * * *